United States Patent

[11] 3,612,860

| | | |
|---|---|---|
| [72] | Inventor | Stanley Hackney<br>Appleton Park, near Warrington, England |
| [21] | Appl. No. | 750,052 |
| [22] | Filed | Aug. 5, 1968 |
| [45] | Patented | Oct. 12, 1971 |
| [73] | Assignee | United Kingdom Atomic Energy Authority<br>London, England |
| [32] | Priority | Aug. 14, 1967 |
| [33] | | Great Britain |
| [31] | | 37329/67 |

[54] EQUIPMENT FOR MONITORING THE RADIOACTIVITY OF COOLANT IN A NUCLEAR REACTOR
8 Claims, 6 Drawing Figs.

[52] U.S. Cl..................................... 250/43.5,
176/19, 250/44, 250/83.1
[51] Int. Cl..................................... G01t 3/00,
G21c 17/02
[50] Field of Search.......................... 250/43.5 R,
44, 83.1, 83.6; 176/19

[56] References Cited
UNITED STATES PATENTS

| | | | |
|---|---|---|---|
| 2,971,089 | 2/1961 | Haywood .................... | 250/43.5 R |
| 3,121,789 | 2/1964 | McGrath ..................... | 250/43.5 R |

*Primary Examiner*—James W. Lawrence
*Assistant Examiner*—Morton J. Frome
*Attorney*—Larson and Taylor ABSTRACT: Equipment for testing for failed nuclear reactor fuel elements has means for presenting samples of coolant from individual fuel elements or groups thereof sequentially to a first detector for detecting such radiation as would be associated with a coolant sample from a failed element, means for presenting the bulked remaining samples to a second separate detector for the said radiation and means to cause the sequentially selected sample to join the bulked samples after passing the first detector. The described equipment is particularly suitable for employment with a liquid metal cooled fast nuclear reactor.

EQUIPMENT FOR MONITORING THE RADIOACTIVITY OF COOLANT IN A NUCLEAR REACTOR

This invention relates to equipment for testing for nuclear reactor fuel element failure.

According to the invention, equipment for testing for nuclear reactor fuel element failure includes means for presenting to a common collecting position samples of reactor coolant each derived from a specific fuel element or group of fuel elements, means at the common collecting position for presenting the samples sequentially to an elongated conduit for flow therealong, first detection means adjacent a portion of said elongated conduit for detection of any radiation from coolant flowing in said conduit, said radiation being such as results from a failed fuel element associated with a coolant sample, means joining the outlet of said conduit to a second conduit extending from said collecting position, means at the common collecting position for presenting to said second conduit for flow therealong those coolant samples not being presented to said elongated conduit, and second detection means adjacent a portion of said second conduit for detection of any radiation as aforesaid.

The said means for presenting coolant samples sequentially to the elongated conduit preferably includes a fixed annular member having spaced orifices with each of which a coolant sample pipe communicates, and a collecting pipe rotatable about the axis of the annular member and communicating at one end with said elongated conduit and at the other end in collecting manner with each of said orifices in turn as the pipe is rotated.

The said means for presenting to said second conduit those coolant samples not being presented to said elongated conduit, preferably comprises a collecting shroud enclosing said annular member, penetrated in sealing manner by said rotatable collecting pipe, and communicating with said second conduit, whereby coolant samples from all the orifices except the one with which said pipe is in communication are collected and passed to said second conduit.

Either or both of said conduits may be provided with flow couplers to induce flow at a satisfactory rate to enable the total scan time of the equipment to be kept within a reasonable limit. A flowmeter may be incorporated within the first-named conduit to enable any blockage thereof to be rapidly ascertained.

The equipment according to the invention is particularly suitable for use with liquid metal coolant from a fast nuclear reactor.

A constructional example of equipment embodying the invention and intended for use with a sodium-cooled fast nuclear reactor, will now be described with reference to the accompanying drawings, wherein.

Figure 6:
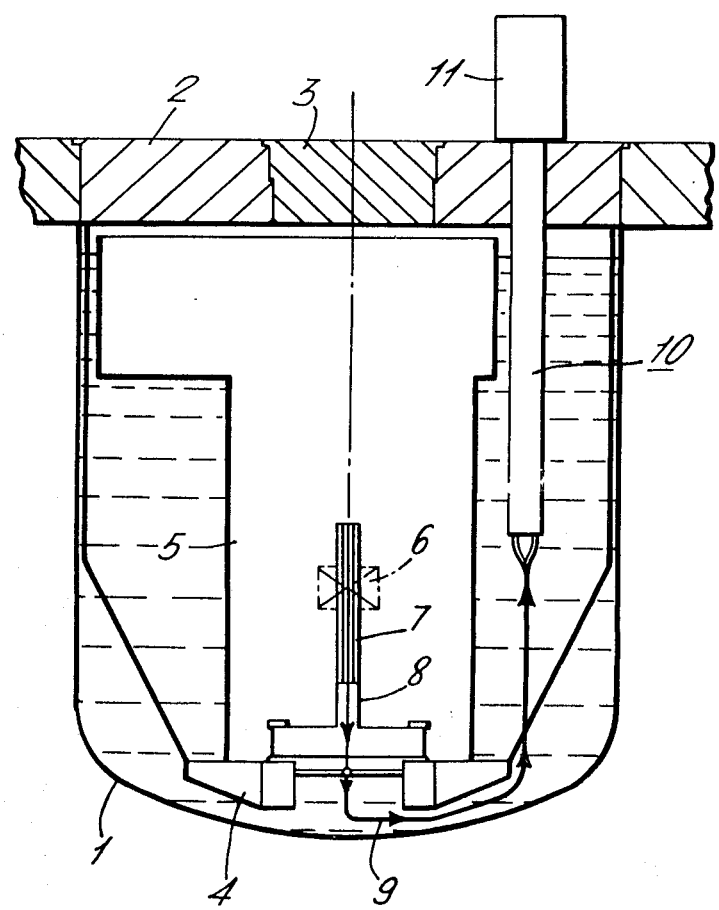
FIG. 6 is a diagrammatic view draw to a smaller scale than FIGS. 1, 2, 4 and 5, illustrating the relative position of the equipment in a typical reactor installation.

Referring firstly to FIG. 6 of the drawings, a sodium-cooled fast nuclear reactor installation briefly comprises a primary vessel 1 containing sodium and roofed by a vault roof 2 incorporating a rotating shield 3, and a support structure 4 for supporting the reactor internals which include an inner vessel 5 containing the reactor core 6 and a radial breeder blanket region (not shown). A single fuel and axial breeder subassembly 7 (which is tubular) supported by a single support tube 8 are shown diagrammatically and much enlarged compared with the other reactor details as it will be appreciated that the core 6 is composed of a large number of such assemblies supported by their respective support tubes. Each fuel and axial breeder subassembly 7 has a sample pipe 9 for sodium coolant, extending from the upper region thereof (so as to sample coolant which has flowed upwardly and over fuel pins in the respective fuel and axial breeder subassembly 7), downwardly to the lower region of the vessel 1, outwardly and then upwardly to failed fuel element detection equipment generally indicated by the reference numeral 10, disposed between the wall of vessel 1 and the wall of vessel 5 and carried from the vault roof 2 with the monitoring portion 11 of the equipment 10 accessible above the roof 2. There are in a typical example 186 of the pipes 9 leading to the equipment 10, which will be described in more detail hereafter. A pump (not shown) is provided for circulating sodium from the upper portion of vessel 5 to primary heat exchangers (not shown) and thence back to the vessel 1 for flow into the open lower end of vessel 5 and upwardly through the fuel and axial breeder subassemblies 7.

Now referring to the construction and operation of the equipment 10, illustrated in FIG. 1–5, the equipment 10 briefly consists of an elongated body portion 20 with a vertically arranged generally cylindrical portion 21 capable of being rotated relative to the body portion 20. The portion 21 is suspended from bearings 22 and its lower end 23 of increased diameter is journaled at 24. The portion 21 is rotatable through a motor 25 and gearbox 26 and at its lower end 23 is a multiposition path selector assembly generally indicated by reference numeral 27. The lower end 28 of the body portion 20 has a plurality (for example, 186 ) of inlets, respectively, 29a, b, c, d, e, ........... (five only being shown in FIGS. 2 and 3 for simplicity) each fed by a sodium sample pipe (one of which is shown in FIG. 6 designated 9) from fuel subassembly units and possibly also from radial breeder units. A collector 30 of the multiposition path selector assembly 27 conducts coolant from the selected sample (29c in FIGS. 2 and 3) to an elongated duct 31 which extends along the portion 21 to a buffer volume 32 then reverses and returns (the reverse portion of the duct 31 being designated 33) to the lower end 23 of the portion 21 ultimately discharging into a pair of ducts 34 (see FIG. 5) which collect all those samples which are not being selected at the time. The ducts 34 extend within the body portion 20 to a buffer volume 35 and from thence a pair of return ducts 36 conduct coolant in return along the body portion 20 to an outlet for returning coolant to the main reactor coolant pool after delay to reduce any activity therein. Flow of coolant along ducts 31, 33, and 34, 36 is induced by electromagnetic pumps 39, 40, respectively. Delayed neutron detectors 37 (FIGS. 1 and 4) are provided adjacent the buffer volume 32 and other delayed neutron detectors 38 (FIGS. 1, 4 and 5) are disposed adjacent the buffer volume 35. The buffer volume 32 thus provides for detection of activity due to a failed fuel element from sequentially selected single samples and the buffer volume 35 provides for bulk detection. Additionally, there may be provided a second bulk detection expedient for monitoring bulk coolant flowing from reactor core to heat exchange means, but this forms no part of the present invention.

Figure 1:
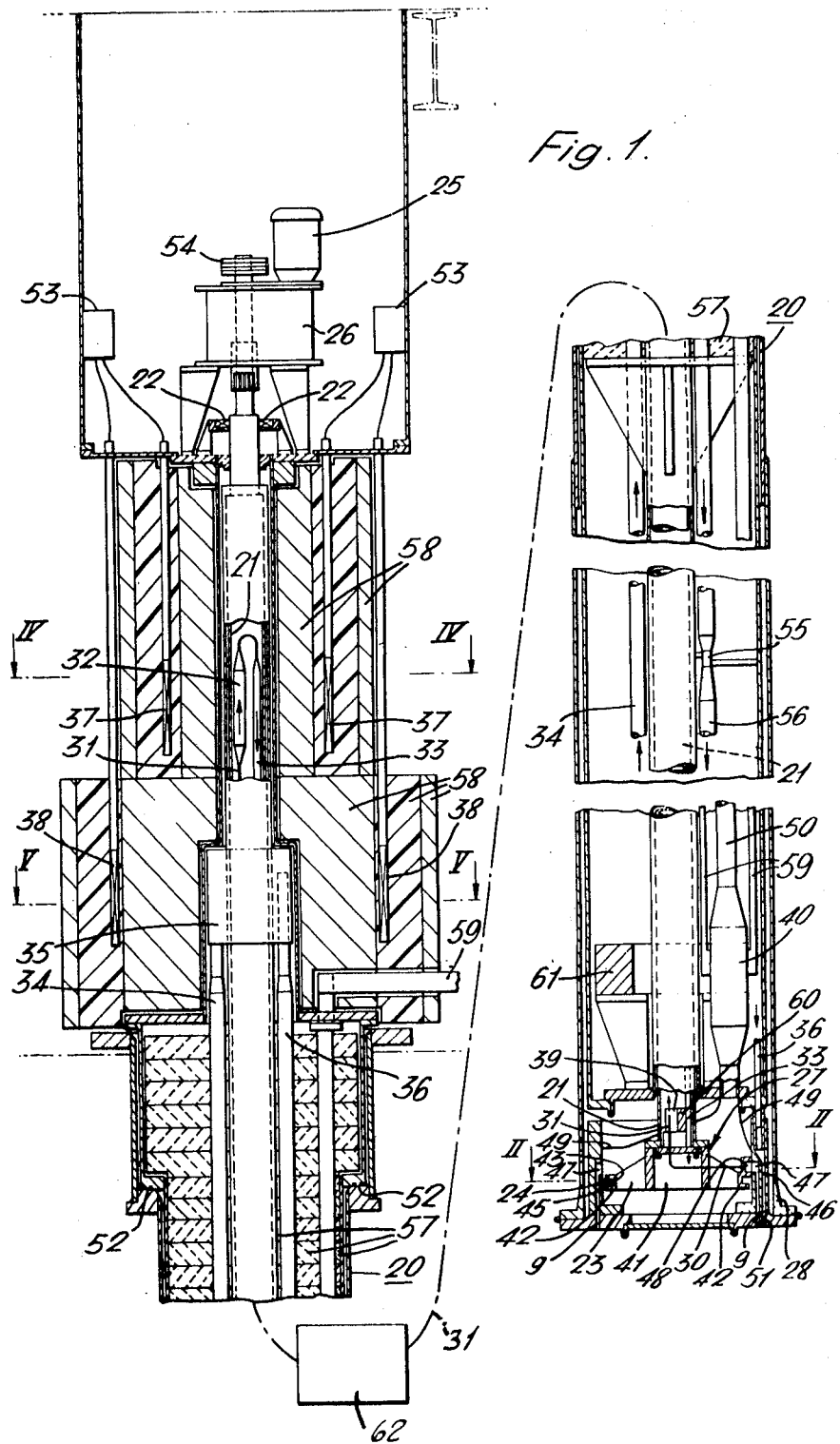
FIG. 1 is a side view in medial section.
Figure 2:
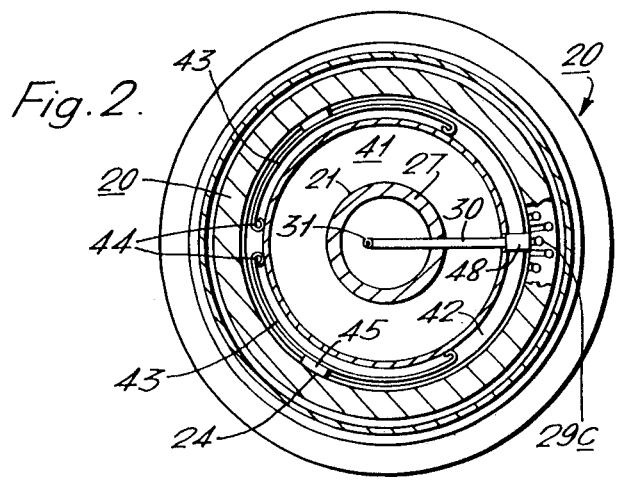
FIG. 2 is an enlarged end view in section on line II—II of FIG. 1.
Figure 4:
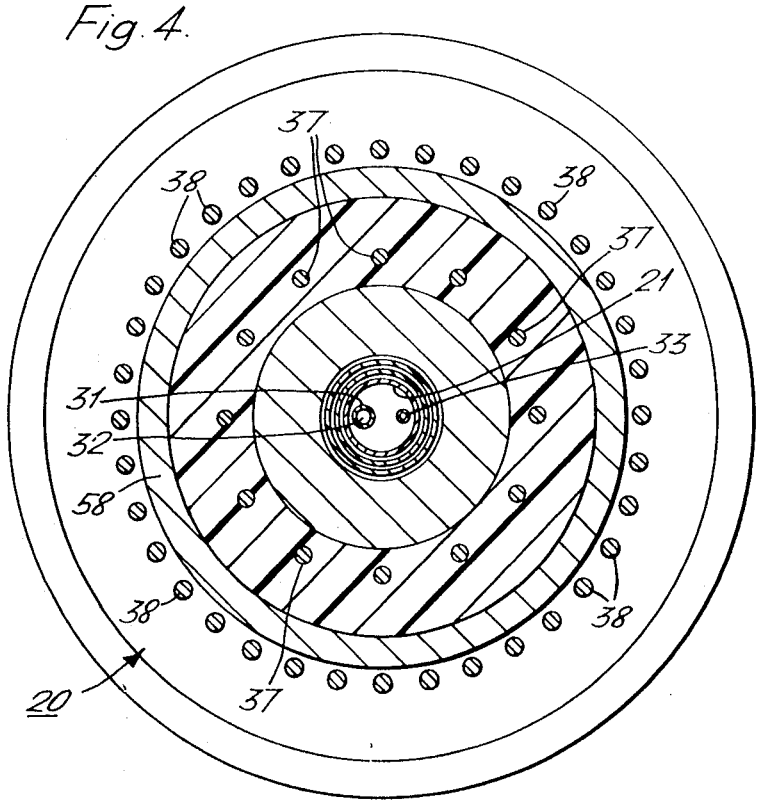
FIG. 4 is an enlarged plan view in section on line IV—IV of FIG. 1.
Figure 3:
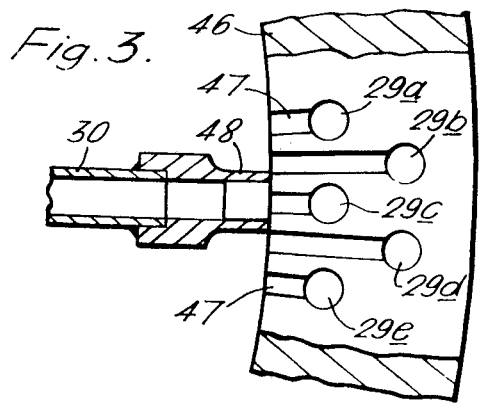
FIG. 3 is an enlarged fragmentary view illustrating a detail of FIG. 2.
Figure 5:
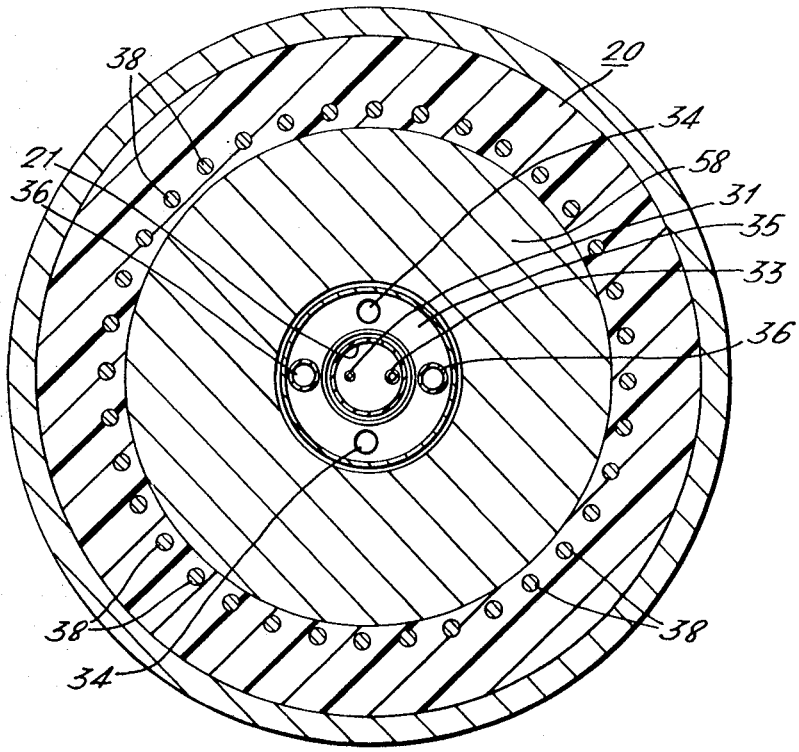
FIG. 5 is a similar view to FIG. 4, in section on line V—V of FIG. 1.

Dealing now with the construction in more detail, and referring firstly to FIGS. 1, 2 and 3, the multiposition path selector assembly 27 consists of a spider 41 mounted at the end 23 of the rotatable portion 21 and carrying a peripherally grooved ring 42 in the groove of which are mounted two curved leaf springs 43 each held at one end by a pin 44 and having a bearing pad 45 secured centrally thereto. Each bearing pad 45 engages with the lower end 28 of the body portion 20 and forms the journal 24 previously referred to. The spider 41 also carries the collector 30 which scans around a ring 46 of the end 28 of the body portion 1, the ring 46 having radial slots 47 forming orifices for sequential communicating engagement by the collector 30. The inlets 29a, b, c, d, e, ........... (as shown) are connected to the slots 47 in two staggered rows as can be seen from FIGS. 2 and 3, the inlets 29a, b, ...... being fed from the pipes 9 as aforesaid. As can be seen from FIG. 3, the collector 30 has a nosepiece 48 which collects from the orifices of the slots 47 one at a time, adjacent slots to the one being engaged (29c in FIGS. 2 and 3) being isolated from collection by the wall of the nosepiece 48. The rotation of the portion 21, and hence the spider 41 connected thereto, is slow and continuous and is performed by the motor 25 and gearbox 26. The relative dimensions of the nosepiece 48 and slots 47 and the speed of rotation of the portion 21 are such that a sufficiently large sample can be collected from each slot 47 and conveyed to the buffer volume 32 for detection of any activity to be certain.

The remainder of the slots 47 (i.e., all those which are not being sampled) are in communication with the ducts 34 by way of a collecting shroud 49 (FIG. 1) and the electromagnetic pump 40, the ducts 34 branching (not shown) from the single pipe outlet 50 from the pump 40. The pump 40 serves to draw sodium along the pipes 9 from the flow thereof within the fuel subassemblies. The pump 40 also forces the bulk sodium along the ducts 34 and into the buffer volume 35, the sodium returning by gravity along the ducts 36 which join to a single outlet 51 and thence to the sodium pool in the vessel 1 of the reactor. The pump 39, which is smaller than the pump 40, serves to draw the small sample from the slot being sampled (the pump 40 having moved it so far) and force it along the duct 31 (which is of smaller bore than the ducts 34 since the volume of the single sample is only a small fraction of the volume of the bulked sample) to the buffer volume 32 and from thence, assisted by gravity and by the suction of pump 40, along the duct 33 where it joins the bulk flow within the shroud 49 passing to the inlet of the pump 40.

It will be noted that a plurality of counters, conveniently of the boron trifluoride type, are provided substantially concentrically with the respective buffer volumes. For the smaller volume being dealt with in the buffer volume 32, 12 counters 37 are considered sufficient, whereas for the larger buffer volume 35, thirty six counters 38 are provided. The counters are wired to amplifiers 53, two of which are shown in FIG. 1, which are themselves connected to monitoring and recording equipment (not shown) in the reactor control room.

A visual collector position indicator, illustrated at 54, changes once on every change of the nosepiece 48 from one slot 47 to the next, and serves to indicate to an operator on the reactor floor the slots being sampled. Equipment (not shown) is also provided for automatically effecting continuation of monitoring on a single slot should a signal of sufficient intensity be provided by the amplifiers 53 from the counters 37. The indicator 54 also initiates switching on and off of the counters 37 so that division between successive samples is effected, due allowance being made for the delay in the sample reaching the buffer volume 32 from the nosepiece 48. A visual and/or audible signal is also provided should the bulk monitor indicate a fuel element failure—this will indicate to an operator that the specific location of the failure must be identified as quickly as possible by scanning the slots 47 with a faster rotation of the portion 21 and thus with a shorter sampling time at each, a faster drive to portion 21 being engageable for this purpose. Provision is also made for automatic and prompt shutdown of the reactor on occurrence of a signal of large intensity from the bulk monitor, to protect the reactor against burnout.

To ensure that no sodium vapor (which may be active should there be a failure) shall reach the reactor floor, elaborate sealing is provided at 52 with provision for seal testing; furthermore a positive gas pressure is provided between the double walls of the body portion 20 and between the rotatable portion 21 and the body portion 20 by means of a venturi device 55 incorporated in the single duct 56 which each main return duct 36 joins, argon being supplied to these regions and excess argon being able to join the pressurized argon gas blanket above the sodium pool in the vessel 1.

The ducts 31, 33, 34 and 36 are suitably shielded by the steel of the body portion 20 and by graphite blocks 57. The buffer volumes 32, 35 are suitably shielded by alternate layers of lead and polyethylene at 58. Conductor bars for the large pump 40 are indicated at 59, and permanent magnets for the pumps 39, 40 are indicated at 60, 61 respectively. A flowmeter 62 is also provided in the duct 31, to indicate to an operator any blockage of that duct or of any of the sodium sample pipes 9 to which the duct 31 may be connected via the nosepiece 48, slots 47 and inlets 29, e.g., by solidification of sodium due to oxide contamination, so that remedial measures may be taken.

I claim:

1. Equipment for testing for failure of nuclear reactor fuel element assemblies comprising means for feeding samples of reactor coolant each derived from a specific fuel element assembly to a common collecting chamber, means at the common collecting chamber for permitting mixing of the individual samples of reactor coolant to form a bulk coolant sample, means for passing said bulk coolant sample continuously from said common collecting chamber through an elongated conduit, first radiation detection means adjacent a portion of said elongated conduit for detection of any radiation from the bulk coolant sample flowing in said elongated conduit, and means at the common collecting chamber for isolating and passing all of the individual samples of reactor coolant, sequentially one at a time, and through a second elongated conduit, second radiation detection means being provided adjacent a portion of said second conduit for detection of any radiation from the individual reactor coolant sample flowing in said second conduit.

2. Equipment according to claim 1, wherein the said means at the common collecting chamber for passing the individual samples of reactor coolant sequentially through the second elongated conduit includes a fixed annular member having spaced orifices with each of which a coolant sample pipe communicates, and a collecting pipe rotatable about the axis of said annular member and communicating at one end with said second elongated conduit and at the other end in collecting manner with each of said orifices in turn as the pipe is rotated.

3. Equipment according to claim 2, wherein the common collecting chamber in which the individual samples of reactor coolant mix to form a bulk coolant sample comprises a collecting shroud enclosing said annular member, penetrated in sealing manner by said rotatable collecting pipe, and communicating with said first elongated conduit, whereby coolant samples from all the said orifices except the one with which said rotatable collecting pipe is in communication are collected and passed to said first elongated conduit.

4. Equipment according to claim 1, wherein at least one of said first elongated conduit and said second conduit are provided with flow couplers for inducing flow of coolant therein.

5. Equipment according to claim 1, wherein a flowmeter is incorporated in said second elongated conduit for enabling any blockage thereof to be rapidly detected.

6. Equipment according to claim 1, as applied to a fast nuclear reactor cooled by liquid metal.

7. Equipment for testing for failure of nuclear reactor fuel element assemblies as claimed in claim 1, wherein the outlet of the second elongated conduit is connected for passage of the individual samples of reactor coolant from the second elongated conduit into the bulk coolant sample in the common collecting chamber.

8. Equipment for testing for failure of nuclear reactor fuel element assemblies comprising means for feeding samples of reactor coolant each derived from a specific fuel element assembly to a common collecting chamber, means at the common collecting chamber for permitting mixing of the individual samples of reactor coolant to form a bulk coolant sample, means for passing said bulk coolant sample continuously from said common collecting chamber to a first detecting station for continuously detecting radiation in said bulk coolant sample, and means operative concurrently with the continuous detecting of the bulk coolant sample for isolating the individual samples, one at a time and in sequence, and passing them to a second station for detecting radiation in said individual samples.

75